United States Patent [19]
Rajewski

[11] Patent Number: 5,980,737
[45] Date of Patent: Nov. 9, 1999

[54] POSITIVE PRESSURE OIL WELL PRODUCTION PACKAGE

[75] Inventor: Robert Karl Rajewski, Donalda, Canada

[73] Assignee: Tornado Flare Systems, Inc., Aleyton, Tex.

[21] Appl. No.: 09/010,567

[22] Filed: Jan. 22, 1998

[51] Int. Cl.⁶ .................................................. C02F 1/40
[52] U.S. Cl. ...................... 210/104; 210/188; 210/257.1; 210/521; 210/539; 210/540; 166/267; 166/75.12
[58] Field of Search ..................... 210/104, 123, 210/188, 257.1, 521, 538, 539, 540; 166/75.12, 267, 310

[56] References Cited

U.S. PATENT DOCUMENTS

| | | | |
|---|---|---|---|
| 3,759,324 | 9/1973 | Mecusker | 166/75.12 |
| 3,822,193 | 7/1974 | Chapman | 210/540 |
| 3,971,719 | 7/1976 | Peters | 210/540 |
| 4,073,734 | 2/1978 | Lowrie | 210/540 |
| 4,416,333 | 11/1983 | Mundhenk et al. | 166/267 |
| 4,521,312 | 6/1985 | Anderson | 210/123 |
| 4,960,513 | 10/1990 | Young | 210/104 |
| 5,042,582 | 8/1991 | Rajewski | 166/75.12 |
| 5,302,294 | 4/1994 | Schubert et al. | 210/188 |
| 5,415,776 | 5/1995 | Homan | 210/539 |
| 5,503,753 | 4/1996 | Woodall et al. | 210/521 |

FOREIGN PATENT DOCUMENTS

| | | |
|---|---|---|
| 1274785 | 10/1990 | Canada . |
| 610977 | 5/1978 | U.S.S.R. . |

OTHER PUBLICATIONS

Tornado Rentals Ltd., Positive Pressure Production Package, distributed in Alberta, Canada, in Oct.–Nov. 1996.

*Primary Examiner*—Christopher Upton
*Attorney, Agent, or Firm*—Anthony R. Lambert

[57] ABSTRACT

A positive pressure oil well production package, comprising a separator vessel connectable to an oil well head and a pressure tight storage vessel connected to receive fluid from the separator via a conduit. First and second vapour outlets connected to a gas disposal system are provided for the separator vessel and pressure tight storage vessel respectively. A weir in the pressure tight storage vessel separates the pressure tight storage vessel into first and second compartments. The weir has a lip over which oil may spill from the first compartment into the second compartment. An oil removal port is provided in the second compartment of the pressure tight storage vessel. The conduit has a discharge end and the conduit extends into the first compartment with the discharge end terminating at or above the lip of the weir.

7 Claims, 1 Drawing Sheet

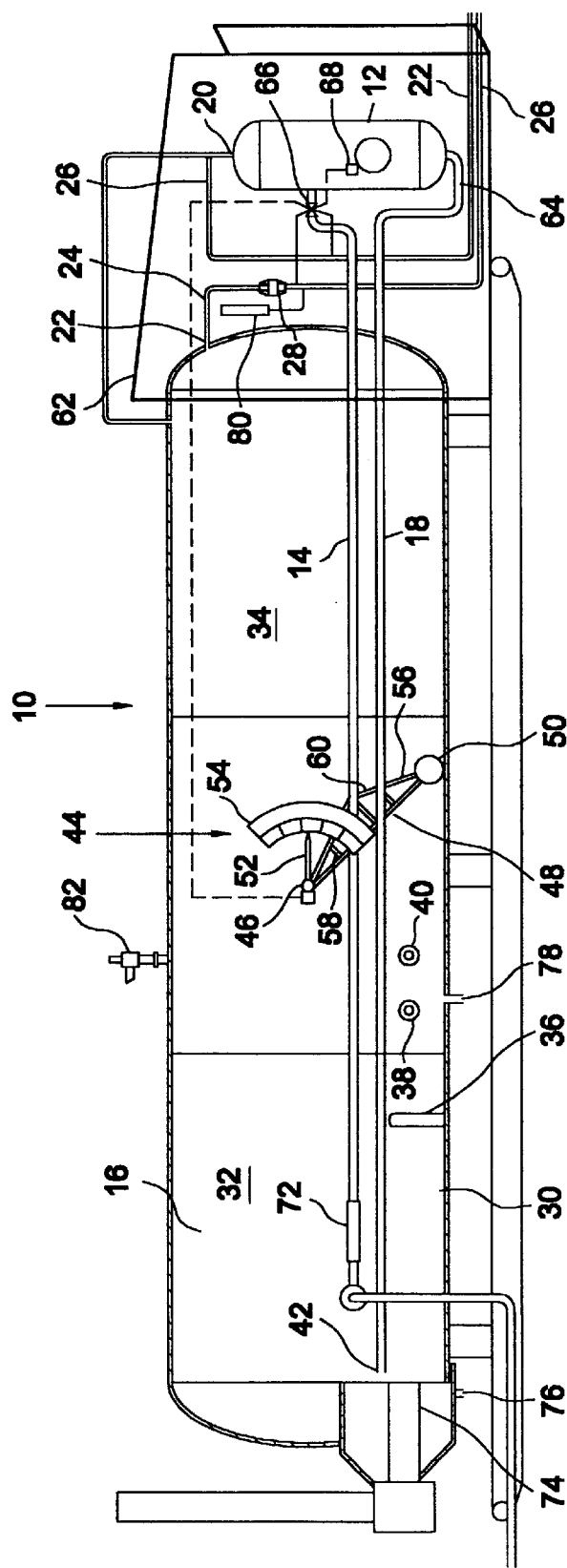
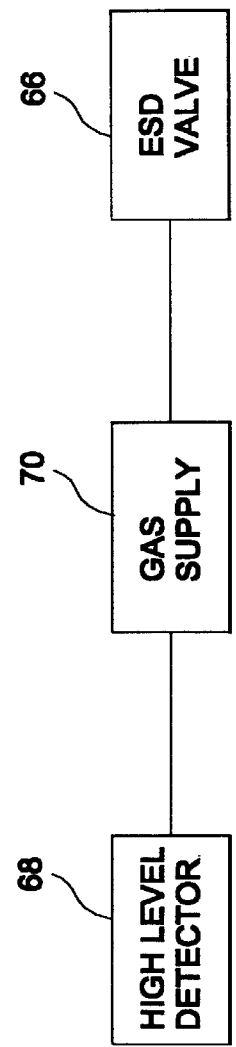
FIG. 1
FIG. 2

POSITIVE PRESSURE OIL WELL PRODUCTION PACKAGE

FIELD OF THE INVENTION

This invention relates to units used to produce oil at oil wells.

BACKGROUND OF THE INVENTION

The inventor has been a pioneer in the odorless production of oil from oil wells. One of his designs is shown in Canadian patent no. 1,274,785 issued Oct. 2, 1990. The inventor has since provided a new design in which fluid is heated before introduction to a separator and then stored in a pressure tight storage vessel after an initial separation of gas and oil in the separator. This design has proved successful, but has encountered some difficulties in operation, particularly in cold weather.

SUMMARY OF THE INVENTION

The inventor has found that freezing of the water in the water side of the pressure tight storage vessel during periods when the vessel is not in operation may block a discharge line from the separator vessel. In addition, low points on the discharge line may freeze. Further, bending of the float arm on the oil level gauge has been found to produce inaccurate readings of liquid level in the storage vessel.

There is therefore provided in accordance with an aspect of the invention, a positive pressure oil well production package, comprising a separator vessel connectable to an oil well head and a pressure tight storage vessel connected to receive fluid from the separator via a conduit. First and second vapour outlets connected to a gas disposal system are provided for the separator vessel and pressure tight storage vessel respectively. A weir in the pressure tight storage vessel separates the pressure tight storage vessel into first and second compartments. The weir has a lip over which oil may spill from the first compartment into the second compartment. An oil removal port is provided in the second compartment of the pressure tight storage vessel. The conduit has a discharge end and the conduit extends into the first compartment with the discharge end terminating at or above the lip of the weir.

In a further aspect of the invention, an oil level gauge disposed within the second compartment comprises, a pivot bar secured to and extending horizontally within the pressure tight storage vessel with a portion of the pivot bar extending outside of the pressure tight storage vessel, a float arm secured to the pivot bar for motion in a vertical plane inside the pressure tight storage vessel, the float arm terminating in a float; an indicator arm secured to the pivot bar for motion adjacent a gauge board outside the pressure tight storage vessel; and the float arm being stiffened by a trestle.

In a further aspect of the invention, the separator vessel is contained within an insulated housing, and a low point of the conduit is contained within the insulated housing.

In a further aspect of the invention, a high liquid level detector on the separator vessel cooperates with a valve on the inlet to the separator to shut off oil flow into the separator vessel upon detection of a high liquid level in the separator vessel.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which:

FIG. 1 shows a side view, broken away to show the inside of a storage vessel, of a unit according to an embodiment of the invention; and FIG. 2 shows a mechanism for shutting off flow into the separator vessel upon detection of a high level condition on the separator vessel.

DETAILED DESCRIPTION OF PREFERRED EMBODIMENTS

Referring to FIG. 1, there is shown a positive pressure oil well production package 10 which contains two major fluid treatment devices, namely a separator vessel 12 which may be connected via conduit 14 to an oil well head (not shown) and a pressure tight storage vessel 16 connected to receive fluid from the separator via a conduit 18. A vapour outlet 20 is provided for the separator vessel 12, and this vapour is run off through a gas disposal system which consists of a conduit 22 running out to a conventional flare stack (not shown) preferably a Tornado™ flare stack available from Tornado Flare Systems (Canada) Inc. of Donalda, Alberta, Canada.

A vapour outlet 24 is provided for the pressure tight storage vessel 16, and this vents gas to the flare stack through line 26 and detonation arrestor 28, preferably a US Coast Guard approved detonation arrestor available for example from Tornado Flare Systems (Canada) Inc.

A weir 30 is provided in the pressure tight storage vessel 16 for separating the pressure tight storage vessel 16 into an oil/water compartment 32 and an oil compartment 34. The weir 30 has a lip 36 over which oil may spill from the compartment 32 into the compartment 34. An oil removal port is provided in the oil compartment 34 which preferably comprises both a high load line 38 and low load line 40. The conduit 18 has a discharge end 42 and the conduit 18 extends into the oil/water compartment 32 with the discharge end 42 terminating at or above the lip 36 of the weir 30.

An oil level gauge 44 is provided for the oil compartment 34. A pivot bar 46 is secured to and extends horizontally within the pressure tight storage vessel 16 with a portion of the pivot bar extending outside of the pressure tight storage vessel 16. A float arm 48 is secured to the pivot bar 46 for motion in a vertical plane inside the pressure tight storage vessel 16. The float arm 48 terminates in a float 50. An indicator arm 52 is secured to the pivot bar 46 for motion adjacent a gauge board 54 outside the pressure tight storage vessel 16. The float arm 48 is stiffened by a trestle 56 formed of three braces 58 secured between the float arm 48 and struts 60.

The separator vessel 12 is preferably housed within an insulated housing 62. The oil conduit 18 has a low point 64 and this should be contained within the insulated housing 62.

High level and high pressure shut downs should be provided. A conventional inlet ESD valve 66 on the oil inlet line should be configured in conventional fashion to close when a high level signal occurs at a switch on the gauge board 54 or when a high pressure reading occurs on the pressure tight storage vessel 16. The ESD valve 66 generally is supplied with a positive pressure from a gas supply 70 (FIG. 2), which maintains the valve in open condition. When a high level or high pressure condition occurs at the pressure tight storage vessel 16, supply of pressure from gas supply 70 to the ESD valve 66 is interrupted, and the ESD valve 66 closes. In addition, this invention provides a high liquid level detector 68 on the separator vessel 12 and a mechanism, such as is illustrated in FIG. 2, provided for shutting off oil flow into the separator vessel 12 upon detection of a high liquid level in the separator vessel 12. As with the conventional high level detector on the pressure tight storage vessel 16, the high level detector 68 on the separator vessel 12 works by a shutting off a gas supply 70 to the ESD valve 66. A high pressure detector may also be provided on the separator 12, which may also be used to close the ESD valve 66 on detection of a high pressure condition in the separator vessel 12.

Oil entering the separator vessel 12 should be pre-heated in line 14 by inline heater 72 to enhance gas/oil separation, prevent freeze up in the separator, reduce wax build up, reduce foaming and assist dumps in working correctly. A conventional burner tube 74 should be provided for heating the fluid in the oil/water compartment 32. The weir level should be above the burner tube 74. Drains 76 and 78 should also be provided for each compartment. A conventional dry flow meter run 80 should be provided to monitor gas flow on the conduit 26. A conventional pressure vacuum vent 82 set at for example 10 psi should be provided on the pressure tight storage vessel to release excessive pressure.

The separator vessel 12 may be rated at 275 psi, with dimensions of 24 inches (diameter) by 5 feet (height) The insulated housing 62 is preferably a walk in housing, heated by a catalytic heater (not shown) and radiant heat from the storage tank 16. It is preferred that the housing 16 and separator vessel 12 be connected and sealed to each other.

In operation, fluid from the oil well is supplied through line 14, where it is heated by heater 72, to the separator vessel 12. After some of the gas is taken off the fluid in the separator vessel 12 through line 22, the fluid is supplied along line 18 into the first compartment 32 of the storage vessel 16. In the compartment 32, the fluid is heated using heater 74 and oil and water separates. Oil spills over the weir into the compartment 34. Gas is flared from the storage vessel 16 through line 26. Periodically, the compartment 34 is emptied into a truck. Having the discharge end 42 above any water line in the compartment 32 prevents it from freezing when the unit is not being heated. The trestle on the float arm 48 prevents bending and breaking of the arm, and ensures accurate readings. The high level shut off for the separator provides added protection for the separator, whereas in the conventional battery only the storage vessel is protected.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. A positive pressure oil well production package, comprising:

a separator vessel connectable to an oil well head by a line;

a heater on the line for heating fluid passing from the oil well head to the separator vessel;

a pressure tight storage vessel connected to receive fluid from the separator via a conduit;

first and second vapour outlets for the separator vessel and pressure tight storage vessel respectively;

the first and second vapour outlets being connectable to a gas disposal system;

a weir in the pressure tight storage vessel for separating the pressure tight storage vessel into first and second compartments, the weir having a lip over which oil may spill from the first compartment into the second compartment;

an oil removal port in the second compartment of the pressure tight storage vessel; and the conduit having a discharge end and the conduit extending into the first compartment with the discharge end terminating at or above the lip of the weir.

2. The positive pressure oil well production package of claim 1 further comprising an oil level gauge disposed within the second compartment in which the oil level gauge comprises:

a pivot bar secured to and extending horizontally within the pressure tight storage vessel with a portion of the pivot bar extending outside of the pressure tight storage vessel;

a float arm secured to the pivot bar for motion in a vertical plane inside the pressure tight storage vessel, the float arm terminating in a float;

an indicator arm secured to the pivot bar for motion adjacent a gauge board outside the pressure tight storage vessel; and the float arm being stiffened by a trestle.

3. The positive pressure oil well production package of claim 1 further comprising:

an insulated housing, the separator vessel being contained within the insulated housing and the pressure tight storage vessel being outside the insulated housing;

the conduit having a low point, and the low point of the conduit being contained within the insulated housing.

4. The positive pressure oil well production package of claim 1 further comprising:

a high liquid level detector on the separator vessel; and means for shutting off oil flow into the separator vessel upon detection of a high liquid level in the separator vessel.

5. A positive pressure oil well production package, comprising:

a separator vessel connectable to an oil well head;

an insulated housing, the separator vessel being contained within the insulated housing;

a pressure tight storage vessel connected to receive fluid from the separator via a conduit;

first and second vapour outlets for the separator vessel and pressure tight storage vessel respectively;

the first and second vapour outlets being connectable to a gas disposal system;

a weir in the pressure tight storage vessel for separating the pressure tight storage vessel into first and second compartments, the weir having a lip over which oil may spill from the first compartment into the second compartment;

an oil removal port in the second compartment of the pressure tight storage vessel;

the conduit having a discharge end and the conduit extending into the first compartment with the discharge end terminating at or above the lip of the weir; and the conduit having a low point, and the low point of the conduit being contained within the insulated housing.

6. The positive pressure oil well production package of claim 5 further comprising an oil level gauge disposed within the second compartment in which the oil level gauge comprises:

a pivot bar secured to and extending horizontally within the pressure tight storage vessel with a portion of the pivot bar extending outside of the pressure tight storage vessel;

a float arm secured to the pivot bar for motion in a vertical plane inside the pressure tight storage vessel, the float arm terminating in a float;

an indicator arm secured to the pivot bar for motion adjacent a gauge board outside the pressure tight storage vessel; and the float arm being stiffened by a trestle.

7. The positive pressure oil well production package of claim 5 further comprising:

a high liquid level detector on the separator vessel; and means for shutting off oil flow into the separator vessel upon detection of a high liquid level in the separator vessel.

* * * * *